US012759312B2

(12) United States Patent
Takagi et al.

(10) Patent No.: US 12,759,312 B2
(45) Date of Patent: Oct. 13, 2026

(54) PRINTING METHOD, PRINTING DEVICE, AND NON-TRANSITORY COMPUTER READABLE MEDIUM STORING PROGRAM

(71) Applicant: MIMAKI ENGINEERING CO., LTD., Nagano (JP)

(72) Inventors: Satoshi Takagi, Nagano (JP); Yukinari Kobayashi, Nagano (JP); Shunsuke Akuta, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 116 days.

(21) Appl. No.: 18/877,238

(22) PCT Filed: Jun. 19, 2023

(86) PCT No.: PCT/JP2023/022580
§ 371 (c)(1),
(2) Date: Dec. 19, 2024

(87) PCT Pub. No.: WO2023/248973
PCT Pub. Date: Dec. 28, 2023

(65) Prior Publication Data
US 2025/0388025 A1 Dec. 25, 2025

(30) Foreign Application Priority Data
Jun. 23, 2022 (JP) ................................ 2022-100951

(51) Int. Cl.
*B41J 2/045* (2006.01)
*B41J 2/21* (2006.01)

(52) U.S. Cl.
CPC ......... *B41J 2/2139* (2013.01); *B41J 2/04508* (2013.01); *B41J 2/0451* (2013.01); *B41J 2/2142* (2013.01); *B41J 2/04586* (2013.01)

(58) Field of Classification Search
CPC .. B41J 2/04508; B41J 2/0451; B41J 2/04586; B41J 2/04593; B41J 2/2132; B41J 2/2139; B41J 2/2142; B41J 19/145
See application file for complete search history.

(56) References Cited

U.S. PATENT DOCUMENTS

| | | | | |
|---|---|---|---|---|
| 7,744,184 | B2 * | 6/2010 | Carlson | B41J 25/005 347/14 |
| 2009/0010498 | A1 * | 1/2009 | Gaston | B41J 2/2142 382/112 |
| 2017/0151775 | A1 * | 6/2017 | Klein Koerkamp | B41J 2/0451 |

FOREIGN PATENT DOCUMENTS

| | | |
|---|---|---|
| JP | 2015054453 | 3/2015 |
| JP | 2017209983 | 11/2017 |
| JP | 7037790 | 3/2022 |

OTHER PUBLICATIONS

"International Search Report (Form PCT/ISA/210) of PCT/JP2023/022580", mailed on Jul. 25, 2023, with English translation thereof, pp. 1-4.

(Continued)

*Primary Examiner* — Anh T Vo
(74) *Attorney, Agent, or Firm* — JCIPRNET

(57) ABSTRACT

A printing method for performing printing using a printing device is provided. The method includes: setting a print condition; checking the print condition; and a print execution stage. The printing device is able to execute a pass modulation operation in which a main scan is executed on the basis of the set number of passes set with an integer value and the number of times of the main scan performed on at least a part of a medium is made larger than the set number of passes. A pass modulation degree is set in the setting of the printing condition. Checking the print condition includes a defective nozzle check stage, checking whether or not (Continued)

nozzle recovery is possible, and searching for a new print condition in a case where the nozzle recovery is impossible.

13 Claims, 8 Drawing Sheets

(56) References Cited

OTHER PUBLICATIONS

"Notice of Reasons for Refusal of Japan Counterpart Application", issued on Dec. 9, 2025, with English translation thereof, pp. 1-10.

* cited by examiner

PRINTING METHOD, PRINTING DEVICE, AND NON-TRANSITORY COMPUTER READABLE MEDIUM STORING PROGRAM

CROSS-REFERENCE TO RELATED APPLICATION

This application is a 371 application of the International PCT application serial no. PCT/JP2023/022580, filed on Jun. 19, 2023, which claims the priority benefits of Japan Patent Application No. 2022-100951, filed on Jun. 23, 2022. The entirety of each of the above-mentioned patent applications is hereby incorporated by reference herein and made a part of this specification.

TECHNICAL FIELD

The present invention relates to a printing method, a printing device, and a program.

BACKGROUND ART

An inkjet printer, which is a printing device that performs printing through an inkjet method, has conventionally been widely used. In addition, regarding a case where a defective nozzle is present in an inkjet head of an inkjet printer, there has been known a method for reducing the influence of the defective nozzle (see, for example, Patent Literature 1).

CITATION LIST

Patent Literature

Patent Literature 1: Japanese Unexamined Patent Publication No. 2015-54453

SUMMARY OF INVENTION

Technical Problems

In order to reduce the influence of a defective nozzle, for example, it is conceivable to eject ink from another nozzle (hereinafter, an alternative nozzle) instead onto an ink ejection position where ink is originally to be ejected from the defective nozzle. However, in this case, for example, if the alternative nozzle is also a defective nozzle, the influence of the defective nozzle cannot be appropriately reduced, and printing cannot be performed with desired quality in some cases. Thus, there has conventionally been a demand to more appropriately reduce the influence of a defective nozzle. Therefore, an object of the present invention is to provide a printing method, a printing device, and a program that can solve the above problems.

Solutions to Problems

In a method of ejecting ink from an alternative nozzle instead of a defective nozzle (hereinafter, referred to as nozzle recovery), a nozzle that can be used as the alternative nozzle differs according to print conditions such as the resolution of printing and the number of passes. Therefore, even if the alternative nozzle is also a defective nozzle under a predetermined print condition, there is a possibility that a normal nozzle can be selected as the alternative nozzle by changing the print condition. However, in a case where the print condition such as the resolution of printing or the number of passes is changed, the quality of printing and the printing speed may greatly change.

The resolution of printing is a print condition that significantly affects the quality of printing. Therefore, in a case where the resolution of printing is changed, the quality of printing greatly changes. In addition, the printing speed may also be significantly reduced by increasing the resolution of printing so as not to reduce the quality of printing. Furthermore, in a case where the resolution of printing is changed, it may also become necessary to recreate print data (job) to be supplied to a printing device. In this case, large rework arises in a process of producing a printed matter. In addition, as the number of passes of the print condition, a value selected from a plurality of types of integer values prepared in advance according to the configuration of the printing device is normally used. Therefore, in a case where the number of passes is changed, normally, the quality of printing discontinuously greatly changes. Therefore, in a case where the number of passes is changed, it can also be considered that a change in the quality of printing caused by changing the alternative nozzle becomes excessively large. In addition, in this case, the printing speed may also be significantly reduced by increasing the number of passes so as to prevent a decrease in the quality of printing.

In addition, in order to reduce the influence of the defective nozzle, it is also conceivable to perform printing only with an inkjet head other than an inkjet head in which the defective nozzle is present using a function of selecting an inkjet head to be used for printing in the printing device. However, in this case, the printing speed may be significantly reduced due to a decrease in the number of inkjet heads to be used. It may also become necessary to recreate the print data depending on the configuration of the printing device. In addition, as a countermeasure against the defective nozzle, it is also conceivable to replace the inkjet head in which the defective nozzle is present. However, in this case, head replacement work may arise, or production may be temporarily stopped waiting for a service response from a manufacturer of the printing device.

On the other hand, the inventors of the present application have found that the influence of the defective nozzle can be more appropriately reduced by using the characteristics of a pass modulation operation such as a Mimaki Advanced Pass System (MAPS) function used in a printing device manufactured by Mimaki Engineering Co., Ltd. In this case, the pass modulation operation can be considered as an operation of performing a main scan (scan) on the basis of the number of passes (set number of passes) set with an integer value of 1 or more, and making the number of times of the main scan performed on at least a part of a medium as a printing target larger than the set number of passes. In this case, the nozzle used as the alternative nozzle can be changed without changing the set number of passes and the resolution. In addition, this makes it possible to appropriately reduce the influence of the defective nozzle using a new print condition that enables nozzle recovery while appropriately preventing a large change in the quality of printing and a significant decrease in the printing speed even in a case where the nozzle to be the alternative nozzle under the initial print conditions is a defective nozzle.

In addition, the inventors of the present application have found features necessary for obtaining such effects through further intensive research, and have reached the present invention. In order to solve the above problems, the present invention provides a printing method for performing printing using a printing device, the printing method including: a data acquisition stage of acquiring print data indicating an image to be printed; a condition setting stage of setting a print condition that is a condition of printing to be executed by the printing device; a condition check stage of checking the print condition set in the condition setting stage; and a print execution stage of causing the printing device to execute a printing operation based on the print data, in which the printing device includes an inkjet head having a nozzle row in which a plurality of nozzles are arranged, performs printing on a medium as a printing target by causing the inkjet head to perform a main scan of ejecting ink while relatively moving in a predetermined main scanning direction with respect to the medium, and a sub scan of relatively moving in a sub scanning direction orthogonal to the main scanning direction with respect to the medium, and is able to execute a pass modulation operation in which the main scan is executed on the basis of the set number of passes that is a number set with an integer value of 1 or more and the number of times of the main scan performed on at least a part of the medium is made larger than the set number of passes, in the condition setting stage, at least a pass modulation degree indicating a degree of modulation for changing the number of times of the main scan performed on at least a part of the medium in the pass modulation operation is set as the print condition, and the condition check stage includes a defective nozzle check stage of checking whether or not a defective nozzle that is the nozzle having a defective ejection characteristic is present in the nozzle row of the inkjet head, a recovery check stage of checking whether or not nozzle recovery is possible using the nozzle different from the defective nozzle in a case where the defective nozzle is present, and a condition search stage of searching for a new print condition that is the new print condition in a case where the defective nozzle is present and the nozzle recovery is impossible, the condition search stage being a stage of searching for the print condition that enables the nozzle recovery by changing the pass modulation degree.

With such a configuration, by changing the pass modulation degree in the condition search stage, it is possible to appropriately change the nozzle that can be used as an alternative nozzle for the defective nozzle. In addition, as a result, even in a case where the nozzle recovery cannot be performed under the initial print condition set in the condition setting stage, the new print condition that enables the nozzle recovery can be appropriately searched for. Furthermore, in this case, by changing the pass modulation degree, a condition that does not change the set number of passes and the resolution of printing can be used as the new print condition that enables the nozzle recovery. In addition, this makes it possible to appropriately reduce the influence of the defective nozzle while appropriately preventing a large change in the quality of printing and a significant decrease in the printing speed. In the condition search stage, the pass modulation degree is preferably changed in a direction in which the quality of printing is improved. With such a configuration, it is possible to appropriately search for the new print condition while maintaining the quality of printing desired by a user. In addition, it is also conceivable to set the direction of changing the pass modulation degree to a direction in which the printing speed decreases according to a condition or the like desired by the user.

In this configuration, the number of times of the main scan performed on a position (each position) of the medium can be considered as the number of times of the main scan in which the inkjet head passes through a position facing the position of the medium. In addition, in a case where the pass modulation degree is changed in the pass modulation operation, an area where the main scan is performed more times than the set number of passes in the medium changes. In this case, it can also be considered that an average value of the number of times of the main scan changes. Therefore, the pass modulation degree can also be considered as a parameter associated with the average value of the number of times of the main scan. In addition, in this case, the average value of the number of times of the main scan can be considered to change in decimal units on the basis of the set number of passes specified by an integer value and the pass modulation degree. Moreover, in this case, it is conceivable to change the average value of the number of times of the main scan in the pass modulation operation in a range from the set number of passes or more to twice the set number of passes or less on the basis of the pass modulation degree. With such a configuration, the pass modulation operation can be appropriately performed. In addition, by changing the pass modulation degree in such a range, the new print condition that enables the nozzle recovery can be appropriately searched for.

In addition, in this configuration, the pass modulation degree is a parameter that takes a value corresponding to 100% in a case where the main scan of the set number of passes is performed on the entire medium, and takes a value corresponding to 50% in a case where the main scans of twice the set number of passes are performed on the entire medium. In this case, in the condition search stage, the print condition that enables the nozzle recovery is searched for by changing the pass modulation degree with a pitch width of 2% or less with the value corresponding to 100%. With such a configuration, the pass modulation degree can be appropriately changed with a pitch width that does not rapidly change the quality of printing and the printing speed. The pitch width for changing the pass modulation degree may be, for example, about 0.5 to 2%. In addition, the pitch width is preferably about 1%, for example. In addition, in the condition search stage, it is conceivable to change the pass modulation degree in a range of less than or equal to the value corresponding to 100% and more than or equal to the value corresponding to 50%. With such a configuration, the condition of the pass modulation operation can be appropriately changed. In addition, as a result, the new print condition that enables the nozzle recovery can be appropriately searched for.

In addition, in this configuration, in the condition setting stage, a sub scan movement amount is set according to the pass modulation degree. In this case, the sub scan movement amount can be considered as a movement amount of relatively moving the inkjet head with respect to the medium in the single sub scan. In addition, in this case, in the condition search stage, the print condition that enables the nozzle recovery is searched for by changing the pass modulation degree to change the sub scan movement amount corresponding to the pass modulation degree. With such a configuration, the new print condition that enables the nozzle recovery can be appropriately searched for.

In addition, in a case where the new print condition that enables the nozzle recovery is found in the condition search stage, a user may be caused to select whether or not to adopt the new print condition. In this case, it is conceivable to cause the user to select either to execute printing using the new print condition or to execute printing by performing no nozzle recovery without using the new print condition. In addition, in the print execution stage, the printing device is caused to execute the printing operation based on the print data on the basis of the user's selection received in the condition search stage. With such a configuration, the printing operation under the print condition desired by the user can be appropriately executed.

In addition, in this case, it is conceivable to omit the selection by the user and automatically adopt the new print condition, for example, under a predetermined condition. For example, in a case where the new print condition that enables the nozzle recovery is found in the condition search stage, it is further determined whether or not the new print condition matches a registered condition registered in advance. In a case where the conditions match, the printing device is caused to execute the printing operation based on the print data using the new print condition in the print execution stage without causing the user to select whether or not to execute printing using the new print condition. With such a configuration, the printing operation under the new print condition can be more efficiently executed. In addition, whether or not to continue such an automatic printing operation may be switched according to an operation mode set for the printing device. In this case, in the case of a predetermined operation mode, the new print condition is automatically adopted as described above. In addition, depending on the configuration of the printing device or the like, the new print condition may be automatically adopted by omitting the selection by the user at all times, for example, in a predetermined operation mode.

In addition, depending on the quality required for printing, the purpose of printing, or the like, it is sometimes necessary to determine the change in the quality of printing and the decrease in the printing speed caused by changing the print condition with a stricter standard. In addition, as a result, even in a case where the new print condition that enables the nozzle recovery is found, it is sometimes desirable to stop (cancel) the printing operation without adopting the new print condition. Therefore, in the condition search stage, for example, it may be determined whether or not the new print condition matches a print stop condition registered as a condition for stopping printing. In a case where the conditions match, it is conceivable to stop the printing operation. With such a configuration, the printing operation can be appropriately stopped under a predetermined condition. As the print stop condition, it is conceivable to register a condition corresponding to a change in the quality of printing beyond a predetermined allowable range, an increase in the printing time beyond a predetermined rate, or the like according to the quality of printing, the printing speed, or the like desired by the user.

In addition, depending on the purpose of printing or the like, a condition other than the pass modulation degree may be further changed to search for the new print condition in the condition search stage. More specifically, in the condition search stage, it is conceivable to further change, for example, the set number of passes or a main scanning speed to search for the print condition that enables the nozzle recovery. In this case, the main scanning speed can be considered as a speed (scan speed) at which the inkjet head is relatively moved with respect to the medium in the main scan. With such a configuration, the print condition that enables the nozzle recovery can be searched for from among more conditions. In addition, this makes it possible to appropriately search for a more preferable new print condition according to the purpose of printing or the like. In this case, for example, it is conceivable to search for a condition under which printing can be continued with a smallest decrease in the printing speed as the new print condition.

In addition, it is also conceivable to prompt a user to change the set number of passes or the main scanning speed by, for example, displaying a dialog or the like instead of automatically changing the set number of passes or the main scanning speed. In this case, it is conceivable to prompt the user to change the set number of passes under a predetermined condition, for example, in the condition search stage. In addition, similarly, it is conceivable to prompt the user to change the main scanning speed under a predetermined condition, for example, in the condition search stage. With such a configuration, it is also possible to search for the print condition that enables the nozzle recovery from among more conditions as necessary. In addition, in this case, it is conceivable to use, as the predetermined condition, a condition corresponding to the fact that the new condition is not found, the printing speed decreases greatly under the new condition, or the like.

In addition, the features of the present invention can also be considered focusing on the sub scan movement amount. In this case, in the condition search stage, the print condition that enables the nozzle recovery is searched for by changing the sub scan movement amount. With such a configuration, it is also possible to appropriately search for the new print condition that enables the nozzle recovery. Also in this case, the printing device executes the main scan on the basis of the set number of passes set with an integer value of 1 or more. In addition, in a case where a value obtained by dividing a nozzle row length, which is the width of the nozzle row in the sub scanning direction, by the set number of passes is defined as a pass width, the sub scan movement amount is changed in a range from 0.5 times or more to 1 time or less of the pass width in the condition search stage. With such a configuration, the new print condition that enables the nozzle recovery can be more appropriately searched for. In addition, as a result, the influence of the defective nozzle can be appropriately reduced. Moreover, as the configuration of the present invention, for example, the configuration of a printing device or a program corresponding to the above description can be considered. Also in this case, the same effects as described above can be obtained.

Effect of the Invention

According to the present invention, the influence of a defective nozzle can be appropriately reduced.

BRIEF DESCRIPTION OF THE DRAWINGS

FIG. 1(*a*) illustrates a configuration example of a main portion of the printing device 10. FIG. 1(*b*) illustrates a configuration example of a head unit 12 in the printing device 10. FIG. 1(*c*) illustrates an example of a functional configuration of a control unit 22 in the printing device 10.

FIG. 2(*a*) illustrates an example of the printing operation in a case where the set number of passes is 1 and a MAPS speed is 100%. FIG. 2(*b*) illustrates an example of the printing operation in a case where the set number of passes is 1 and the MAPS speed is 75%.

FIG. 3(*a*) illustrates an example of the printing operation in a case where the set number of passes is 2 and the MAPS speed is 100%. FIG. 3(*b*) illustrates an example of the printing operation in a case where the set number of passes is 2 and the MAPS speed is 75%.

FIG. 4(*a*) illustrates an example of the printing operation in a case where the set number of passes is 2 and the MAPS speed is 66%. FIG. 4(*b*) illustrates a modified example of the printing operation in a case where the set number of passes is 2 and the MAPS speed is 100%.

FIGS. 8(*a*) and 8(*b*) illustrate an example of a dialog requesting the user to perform selection.

DESCRIPTION OF EMBODIMENTS

Figure 1A:
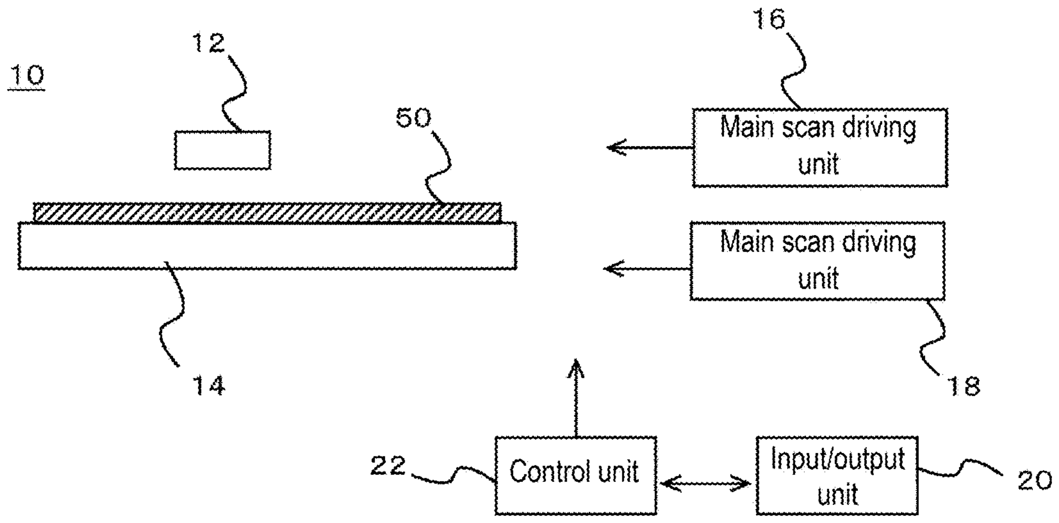
FIGS. 1(*a*)~1(*c*) are drawings for explaining a printing device 10 that executes a printing method according to an embodiment of the present invention.
Figure 1B:
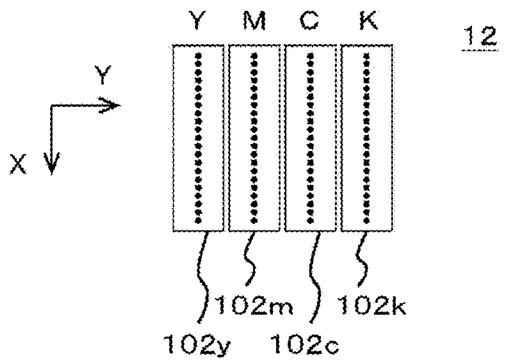
Figure 1C:
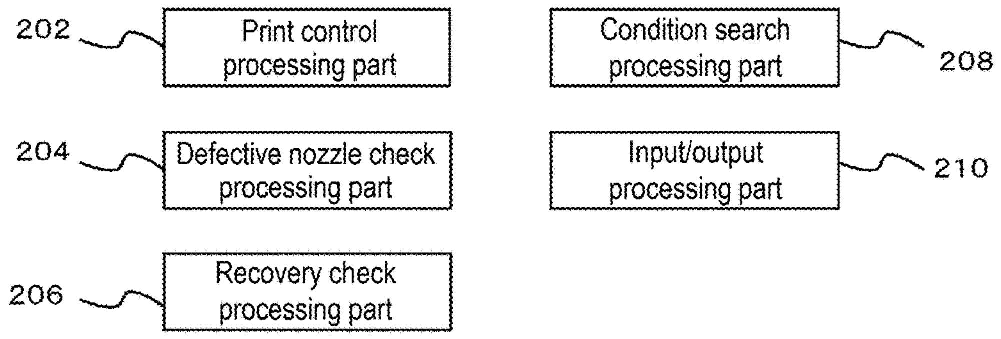

Hereinafter, an embodiment according to the present invention will be described with reference to the drawings. FIG. 1 is a drawing for explaining a printing device 10 that executes a printing method according to an embodiment of the present invention. FIG. 1(*a*) illustrates a configuration example of a main portion of the printing device 10. FIG. 1(*b*) illustrates a configuration example of a head unit 12 in the printing device 10. FIG. 1(*c*) illustrates an example of a functional configuration of a control unit 22 in the printing device 10. Except for points described below, the printing device 10 may have a feature identical or similar to a known printing device. In addition to the illustrated configuration, the printing device 10 may further include a configuration identical or similar to a known printing device. For example, the printing device 10 may further include a fixing means or the like for fixing ink to a medium (medium) 50 as a printing target. As the fixing means, it is conceivable to use, for example, a heater, an ultraviolet light source, or the like according to the type of ink used in the printing device 10.

The printing device 10 of the present example is an inkjet printer that performs color printing on the medium 50 through an inkjet method, and includes the head unit 12, a platen 14, a main scan driving unit 16, a sub scan driving unit 18, an input/output unit 20, and the control unit 22. The head unit 12 is a portion including an inkjet head 102 that ejects ink onto the medium 50. In addition, the head unit 12 of the present example includes a plurality of inkjet heads 102*y* to 102*k* as distinctively denoted by reference numerals 102*y* to 102*k* in FIG. 1(*b*). In this case, the inkjet head 102*y* ejects yellow (Y) ink. The inkjet head 102*m* ejects magenta (M) ink. The inkjet head 102*c* ejects cyan (C) ink. The inkjet head 102*k* ejects black (K) ink.

In addition, in the present example, the plurality of inkjet heads 102*y* to 102*k* are disposed side by side in a main scanning direction (Y direction in the drawing) orthogonal to a predetermined sub scanning direction (X direction in the drawing) set in the printing device 10 with their positions in the sub scanning direction aligned with each other. In the following, for convenience of description, a feature in which the inkjet heads 102*y* to 102*k* do not have to be distinguished will be simply described as the feature of the inkjet head 102. The inkjet head 102 of the present example has a nozzle row in which a plurality of nozzles are arranged. In addition, the plurality of nozzles in the nozzle row are arranged with their positions in the sub scanning direction shifted from each other. In this case, the nozzle row can be considered as a row in which the plurality of nozzles are arranged in a nozzle row direction parallel to the sub scanning direction. In addition, the inkjet heads 102*y* to 102*k* may be arranged in a different manner from the above. For example, some of the inkjet heads 102 may have different positions in the sub scanning direction from the other inkjet heads 102.

The platen 14 is a table-shaped member that holds the medium 50 at a position facing the head unit 12. The main scan driving unit 16 is a driving unit that causes the inkjet head 102 of the head unit 12 to perform a main scan (scan). The main scan can be considered as an operation of ejecting ink while relatively moving in the main scanning direction with respect to the medium 50. In addition, the sub scan driving unit 18 is a driving unit that causes the inkjet head 102 of the head unit 12 to perform a sub scan. The sub scan can be considered as an operation of relatively moving in the sub scanning direction with respect to the medium 50. The sub scan driving unit 18 of the present example changes an area of the medium 50 facing the head unit 12 by causing the inkjet head 102 to perform the sub scan between the main scans. In addition, this changes a range of the medium 50 in which ink is ejected from the inkjet head 102 in the next main scan. In addition, in this case, the sub scan driving unit 18 causes the inkjet head 102 to perform the sub scan on the basis of a sub scan movement amount set according to print conditions (print conditions). The sub scan movement amount can be considered as a movement amount of relatively moving the inkjet head 102 with respect to the medium 50 in the single sub scan. In addition, the sub scan driving unit 18 causes the inkjet head 102 to perform the sub scan by conveying the medium 50 in a conveyance direction parallel to the sub scanning direction. In this case, the sub scan can also be considered as an operation corresponding to a feeding operation of feeding the medium 50 with respect to the head unit 12. In addition, the sub scan movement amount can be considered as a movement amount corresponding to a feed amount (feed amount) of the medium 50.

In addition, as can be understood from the above description, the printing device 10 performs printing on the medium 50 by causing the inkjet head 102 to perform the main scan and the sub scan. In this case, the printing device 10 executes the main scan on the basis of the set number of passes, which is a number set with an integer value of 1 or more. In addition, the printing device 10 of the present example can further execute a printing operation using a Mimaki Advanced Pass System (MAPS) function according to an operation mode set by a user, for example. The MAPS function will be described in more detail later.

The input/output unit 20 is an interface unit that inputs and outputs data and information to/from the printing device 10. The input/output unit 20 of the present example receives input of print data (job) indicating an image to be printed. In this case, the input/output unit 20 receives the print data from a computer that generates the print data. In addition, the input/output unit 20 displays information, receives an instruction, and the like to/from the user of the printing device 10. For example, the input/output unit 20 displays a request for the user to select a print condition or the like, gives various notifications, and the like to the user. In addition, the input/output unit 20 receives, for example, setting of the operation mode of the printing device 10, setting of the print conditions, an answer to the selection requested for the user, and the like from the user. The input/output unit 20 may input and output data and information via a computer (for example, a control PC or the like) that controls the operation of the printing device 10. In addition, in this case, this computer can also be considered as constituting at least a part of the input/output unit 20.

The control unit 22 is, for example, a portion including a CPU of the printing device 10, and controls the operation of each unit of the printing device 10 on the basis of the print data or the user's instruction received via the input/output unit 20. In addition, the control unit 22 of the present example functionally operates as a print control processing part 202, a defective nozzle check processing part 204, a recovery check processing part 206, a condition search processing part 208, an input/output processing part 210, and the like, for example, as illustrated in FIG. 1(*c*) by operating according to a program such as firmware. In this case, the print control processing part 202 can be considered as a processing part that performs control related to the main scan and the sub scan. In addition, the print control processing part 202 of the present example controls the printing operation by the printing device 10 by causing the inkjet head 102 to perform the main scan and the sub scan on the basis of the print conditions set on the basis of the user's instruction and the print data.

In addition, in a case where a defective nozzle is present in any inkjet head 102 in the head unit 12 of the present example, the control unit 22 performs nozzle recovery processing for reducing the influence of the defective nozzle, adjustment of the print conditions, and the like by operating as the defective nozzle check processing part 204, the recovery check processing part 206, and the condition search processing part 208 as necessary. In this case, the defective nozzle can be considered as a nozzle having a defective ejection characteristic. The defective ejection characteristic can be considered that the ejection characteristic is out of a predetermined normal range. The defective nozzle can be considered as, for example, a non-ejecting nozzle that fails to eject ink due to clogging or the like. The control unit 22 of the present example registers, as the defective nozzle, a nozzle that does not become normal (cannot be restored) even when predetermined maintenance such as cleaning is performed on the inkjet head 102 or the nozzle. In addition, the nozzle recovery can be considered as processing using a different nozzle (hereinafter, referred to as an alternative nozzle) from the defective nozzle in a case where the defective nozzle is present. In this case, the alternative nozzle can be considered as another nozzle used instead of the defective nozzle. In addition, more specifically, the nozzle recovery can be considered as a process of ejecting ink from the alternative nozzle onto an original ejection position with the defective nozzle. In this case, the original ejection position with the defective nozzle can be considered as an ejection position where ink is to be ejected if the defective nozzle is a normal nozzle. In addition, in this case, it is conceivable to register the position of the defective nozzle in advance, and eject ink from the alternative nozzle instead in a different main scan from a main scan in which the defective nozzle is to eject ink onto the original ejection position. With such a configuration, the influence of the defective nozzle can be appropriately reduced.

In addition, the defective nozzle check processing part 204 can be considered as a processing part that checks the presence or absence of the defective nozzle in the inkjet head 102 and the position of the defective nozzle. The recovery check processing part 206 can be considered as a processing part that checks whether or not the nozzle recovery for the defective nozzle checked by the defective nozzle check processing part 204 is possible. The condition search processing part 208 can be considered as a processing part that searches for a new print condition in a case where the nozzle recovery is impossible. In addition, the defective nozzle check processing part 204, the recovery check processing part 206, and the condition search processing part 208 perform the above processing in a case where the setting for enabling the nozzle recovery is made according to the user's instruction or the like.

In addition, in this case, when the defective nozzle check processing part 204 confirms that the defective nozzle is present and the recovery check processing part 206 confirms that the nozzle recovery for the defective nozzle is possible, the recovery check processing part 206 causes the print control processing part 202 to control the printing operation in which the nozzle recovery is performed. On the other hand, in a case where the defective nozzle is present but the nozzle recovery is impossible, the recovery check processing part 206 causes the condition search processing part 208 to search for a new print condition that enables the nozzle recovery. In the nozzle recovery of the present example, the alternative nozzle is used instead of the defective nozzle as described above. In this case, it is necessary to use a nozzle at a predetermined position determined according to the print conditions or the like, as the alternative nozzle. Therefore, for example, in a case where the nozzle at the position of the alternative nozzle is also a defective nozzle, the nozzle recovery cannot be performed. For example, in such a case, the condition search processing part 208 of the present example searches for the new print condition. The operation of searching for the new print condition in the condition search processing part 208 will be described in more detail later.

In a case where the condition search processing part 208 searches for the new print condition, the input/output processing part 210 causes the user to check the search result and receives an instruction. An item to be checked by the user in relation to the search for the new print condition, an instruction received from the user, and the like will also be described in more detail later. According to the present example, the control unit 22 can appropriately control the operation of the printing device 10. In addition, as a result, the printing operation on the medium 50 can be appropriately executed.

Next, the MAPS function and the like used in the printing device 10 will be described in more detail. The printing operation using the MAPS function in the present example is an example of a pass modulation operation. In this case, the pass modulation operation can be considered as an operation of making the number of times of the main scan performed on at least a part of the medium 50 larger than the set number of passes. In addition, as also described above, the set number of passes in the present example is a number set with an integer value of 1 or more. The set number of passes can be considered as the number of passes with an integer value serving as a reference in the MAPS function.

In addition, in a case where printing is performed by the printing device (serial type printing device) configured to perform the main scan and the sub scan, for example, it is conceivable to set the resolution, the number of passes, and the like as the print conditions. In this case, the number of passes can be considered as a set value corresponding to the number of times of the main scan performed on the same position of the medium 50. In this case, the number of times of the main scan performed on the same position can be considered as the number of times of the main scan in which the inkjet head 102 passes through a position facing this position. The number of passes is usually set as an integer value as in the set number of passes described above. On the other hand, in the MAPS function, the number of times of the main scan performed on at least a part of the medium 50 is made larger than the set number of passes as in the pass modulation operation described above. In addition, in this case, as the width in the sub scanning direction of an area where the number of times of the main scan is increased or the number of times of the main scan performed on this area changes, an average value of the number of times of the main scan changes including a non-integer value. In this case, the average value of the number of times of the main scan can be considered as an average value of the number of times of the main scan in which the inkjet head 102 passes through a position facing each position of the medium 50. In addition, the average value of the number of times of the main scan can also be considered as an average value with respect to the number of times of the main scan for each position in the sub scanning direction.

In addition, in the MAPS function of the present example, a MAPS speed is used as a set value in addition to the set number of passes of the printing device 10. In this case, the MAPS speed is an example of a pass modulation degree. The pass modulation degree can be considered as a parameter indicating the degree of modulation for changing the number of times of the main scan performed on at least a part of the medium 50 in the pass modulation operation. In addition, the printing device 10 of the present example sets the sub scan movement amount in the sub scan according to the MAPS speed. In this case, the sub scan movement amount changes according to the MAPS speed, so that the area where the main scan is performed more times than the set number of passes in the medium 50 changes. Furthermore, as a result, the average value of the number of times of the main scan also changes. Therefore, the MAPS speed can also be considered as a parameter associated with the average value of the number of times of the main scan. In addition, the average value of the number of times of the main scan in the present example changes in decimal units on the basis of the set number of passes and the MAPS speed.

In addition, as the MAPS speed of the present example, a value in a range from 50% or more to 100% or less is set. In this case, the MAPS speed of 100% is a value corresponding to a case where the main scan(s) of the set number of passes is (are) performed on the entire medium 50. The MAPS speed of 50% is a value corresponding to a case where the main scans of twice the set number of passes are performed on the entire medium 50. In addition, in this case, the MAPS speed of 100% can also be considered as a MAPS speed at which the average value of the number of times of the main scan is equal to the set number of passes. The MAPS speed of 50% can also be considered as a MAPS speed at which the average value of the number of times of the main scan is equal to twice the set number of passes. In addition, as also described above, the MAPS speed of the present example is an example of the pass modulation degree. In this case, the MAPS speed of 100% can be considered as a value corresponding to the pass modulation degree of 100%. The MAPS speed of 50% can be considered as a value corresponding to the pass modulation degree of 50%. In addition, in a case where the MAPS speed is greater than 50% and smaller than 100%, the average value of the number of times of the main scan can be considered to be a value greater than the set number of passes and smaller than twice the set number of passes. In this case, it can be considered that the average value of the number of times of the main scan is changed in a range from the set number of passes or more to twice the set number of passes or less according to the MAPS speed.

In the following, the average value of the number of times of the main scan determined according to the set number of passes and the MAPS speed is referred to as the decimal number of passes. The decimal number of passes can also be considered as the effective number of passes calculated as a decimal on the basis of the set number of passes and the MAPS speed. In addition, the sub scan movement amount of the present example changes according to the MAPS speed as described above. Therefore, the decimal number of passes can also be considered in association with the sub scan movement amount. In this case, the decimal number of passes can be considered to be a value obtained by dividing a nozzle row length in the inkjet head 102 by the sub scan movement amount. The nozzle row length can be considered as the width in the sub scanning direction of the nozzle row. In addition, the nozzle row length can also be considered as the width in the sub scanning direction of a range in which the nozzles are arranged in the nozzle row of the inkjet head 102 that ejects ink of one color. Moreover, in this regard, it is conceivable to use, for example, a virtual nozzle row configured by a plurality of inkjet heads arranged in a staggered arrangement, as the nozzle row of the inkjet head 102 that ejects ink of one color. In this case, the virtual nozzle row can be considered as a nozzle row in which nozzle rows of a plurality of inkjet heads are virtually connected into one row. In such a case, the nozzle row length can be considered as the nozzle row length of such a virtual nozzle row.

Here, the sub scan movement amount of the present example is maximized when the MAPS speed is 100%. As the MAPS speed is decreased, the sub scan movement amount also decreases. The sub scan movement amount is minimized when the MAPS speed is 50%. In this case, when the MAPS speed is decreased, the sub scan movement amount decreases, so that the printing speed also decreases. Therefore, the MAPS speed can also be considered as a parameter associated with the printing speed. In addition, in a case where printing is performed using the MAPS function, for example, a pass boundary can be made inconspicuous by adjusting the MAPS speed to make the sub scan movement amount smaller than a sub scan movement amount determined only by the set number of passes. In this case, the sub scan movement amount determined only by the set number of passes can be considered as a movement amount corresponding to a distance obtained by dividing the nozzle row length by the set number of passes. In addition, in this case, by making the sub scan movement amount smaller than such a distance, a pass end is diffused (dispersed), and the pass boundary can be made inconspicuous as described above.

The control unit 22 (the print control processing part 202) of the present example manages the plurality of nozzles in the nozzle row of the inkjet head 102 by dividing them into pass ranges corresponding to the set number of passes arranged sequentially in the sub scanning direction. In this case, the pass range can be considered as a range associated with one main scan among a plurality of main scans performed on each position of the medium 50. In addition, in a case where a value obtained by dividing the nozzle row length by the set number of passes is defined as a pass width, the pass range can be considered as a range corresponding to the pass width in the nozzle row. In addition, in this case, each pass range passes through a position facing the same position of the medium 50 by repeating the main scan and the sub scan. Moreover, as a result, the printing device 10 performs a plurality of main scans on the same position of the medium. In this case, an area where the nozzles in one pass range eject ink can be considered as corresponding to the pass described above. In addition, the boundary of such areas can be considered as the pass boundary.

In addition, in the MAPS function, a mask selected according to the set number of passes and the MAPS speed is used as a mask used to determine the ejection position to eject ink in the main scan. In this case, in a portion of the mask corresponding to the area where more times of the main san are performed than the set number of passes, the percentage of selecting the ejection position (the density of the mask) decreases. In addition, in this case, when the sub scan movement amount decreases according to the setting of the MAPS speed, the area where more times of the main scan are performed than the set number of passes becomes wider in a range including the pass boundary. In addition, as a result, the pass end is diffused, and the pass boundary becomes inconspicuous. Therefore, by using the MAPS function, the occurrence of banding and color unevenness in which the pass boundary is excessively conspicuous can be reduced, and high quality printing can be performed.

In addition, in the present example, for example, it is conceivable to perform printing as illustrated in FIGS. 2 to 5 using the MAPS function. FIGS. 2 to 5 are drawings illustrating, in a simplified manner, the printing operation executed using the MAPS function. In FIGS. 2 to 5, for convenience of illustration, an example of the printing operation is illustrated using one inkjet head 102 (see FIG. 1) in which 16 nozzles are arranged. In addition, regarding the manner of selecting the ejection position to eject ink in each main scan, a simplified example of a case is illustrated in which the ejection position is selected in an easily illustrated state with the mask density set to discrete values such as 100%, 50%, 25%, and 0% as indicated by a shaded pattern in the drawings. The inkjet head 102 of the actual printing device 10 (see FIG. 1) may have more nozzles. In addition, as the mask, for example, a more complicated mask may be used in a manner identical or similar to a known MAPS function. In this case, a mask whose density changes in a gradation manner can be suitably used. In addition, it is also conceivable to cause the user to select a mask from among a plurality of types of masks.

Figure 2A:
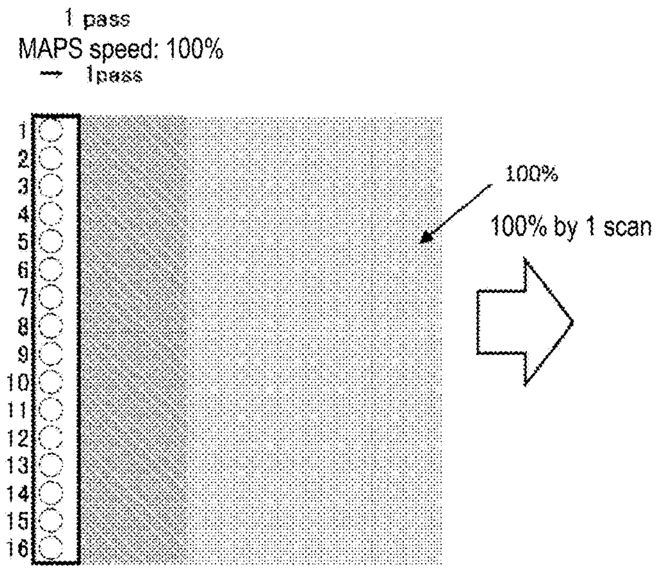
FIGS. 2(*a*)~2(*b*) are drawings illustrating an example of a printing operation in a case where the set number of passes is 1.
Figure 2B:
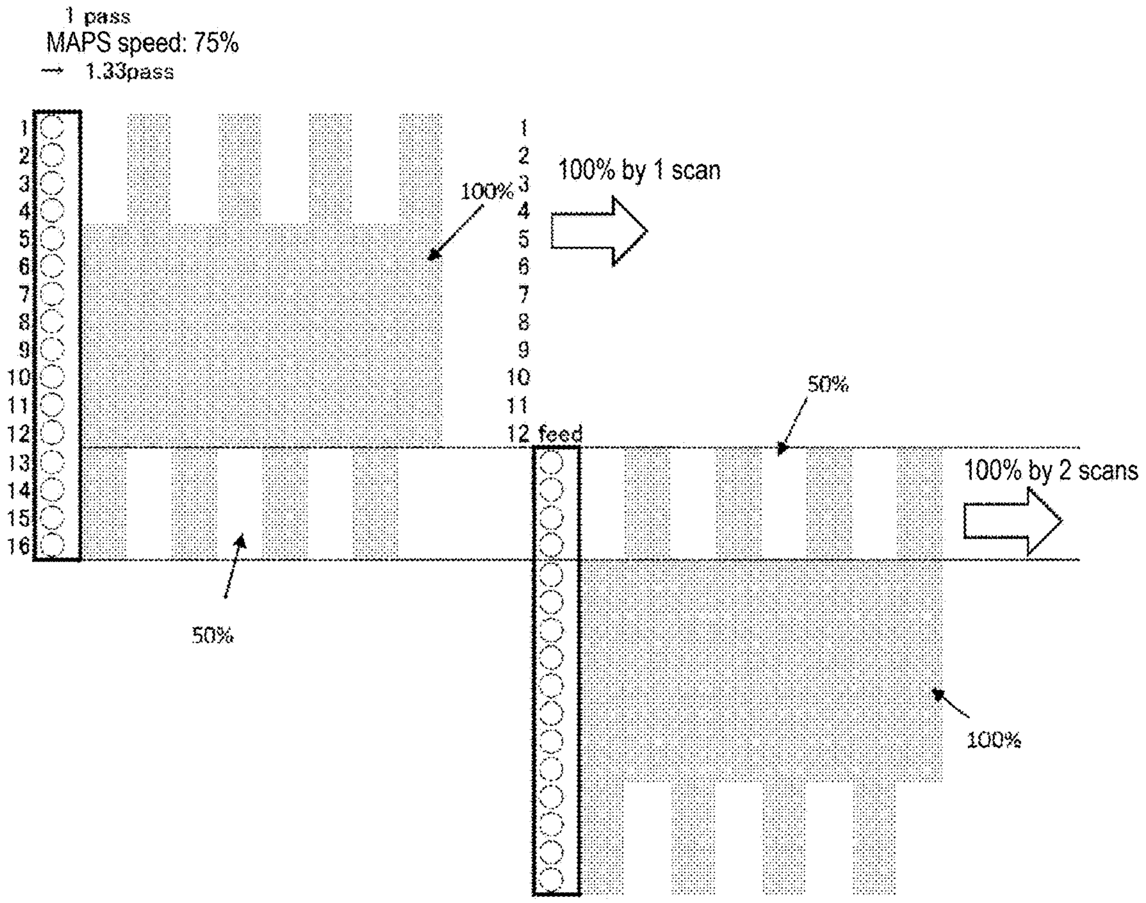

In FIGS. 2 to 5, FIG. 2 illustrates an example of the printing operation in a case where the set number of passes is 1 (1 Pass). FIG. 2(*a*) illustrates an example of the printing operation in a case where the set number of passes is 1 and the MAPS speed is 100%. In this case, the printing device 10 performs only one main scan with respect to all the positions of the medium. Therefore, the manner of selecting the ejection position to eject ink in each main scan is selection of 100% in which all the ejection positions are selected. In this case, the manner of selecting the ejection position can be considered as a manner of selection in a case where so-called solid printing is performed. Therefore, in a case where printing other than solid printing is performed, it can be considered that ink is ejected onto an ejection position selected according to an image to be printed among the ejection positions for ejecting ink in solid printing. In addition, the sub scan movement amount of the present example is a distance obtained by multiplying the pass width, which is a value obtained by dividing the nozzle row length by the set number of passes, by the percentage of the MAPS speed. In a case where the set number of passes is 1 in the illustrated configuration, the pass width is the width in the sub scanning direction of the 16 nozzles. Therefore, in a case where the set number of passes is 1 and the MAPS speed is 100%, the sub scan movement amount is equal to the width in the sub scanning direction of the 16 nozzles.

In addition, FIG. 2(*b*) illustrates an example of the printing operation in a case where the set number of passes is 1 and the MAPS speed is 75%. In this case, the printing device 10 performs only one main scan with respect to one portion of the medium, and performs two main scans with respect to the other portion. A left-side pattern in the drawing illustrates, in a simplified manner, an example of the ejection positions to eject ink in the first main scan in the two main scans performed continuously. In addition, a right-side pattern illustrates, in a simplified manner, an example of the ejection positions to eject ink in the second main scan. In addition, in this case, with regard to 4 nozzles on one end side and 4 nozzles on the other end side in the sub scanning direction among the 16 nozzles arranged in the inkjet head 102, the manner of selecting the ejection position to eject ink in each main scan is selection of 50% in which half the ejection positions of the case of 100% are selected. In addition, with regard to the other 8 nozzles in the central portion, the manner of selecting the ejection position is selection of 100%. In this case, the sub scan movement amount is the width in the sub scanning direction of 12 nozzles corresponding to 75% of the pass width. In addition, the decimal number of passes is 1.33 (1.33 Passes). In addition, as a result, the printing device 10 performs ejection of 100% onto the positions where ink is ejected from the nozzles for which 100% is selected, by one main scan (1 scan), for example, as illustrated in the drawing. Moreover, in this case, with regard to the ejection positions to eject ink from the nozzles for which 50% is selected, the ejection positions in the two main scans are selected in a complementary relationship, so that ink is ejected in the second main scan onto the ejection positions where no ink is ejected in the first main scan. In addition, as a result, the printing device 10 performs ejection of 100% onto the positions where ink is ejected from the nozzles for which 50% is selected, by two main scans (2 scans), for example, as illustrated in the drawing.

Figure 3A:
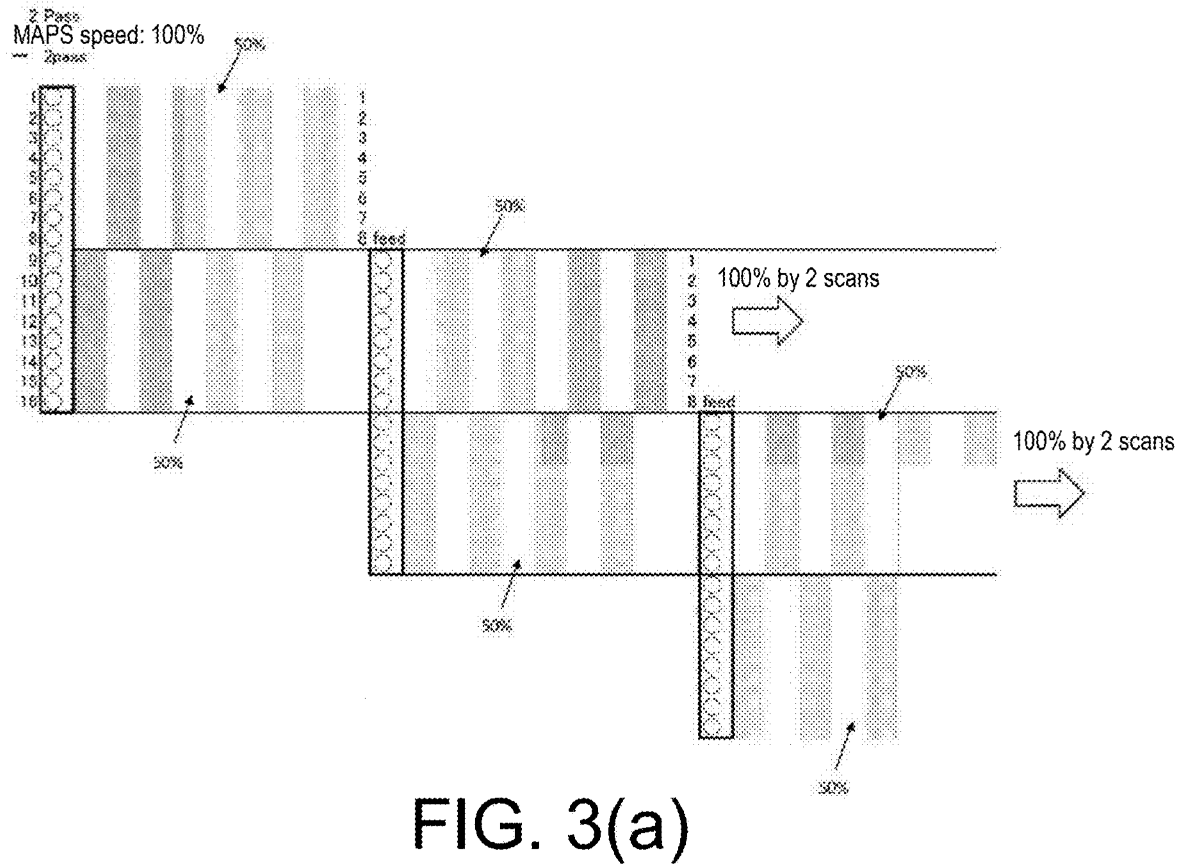
FIGS. 3(*a*)~3(*b*) are drawings illustrating an example of a printing operation in a case where the set number of passes is 2.
Figure 3B:
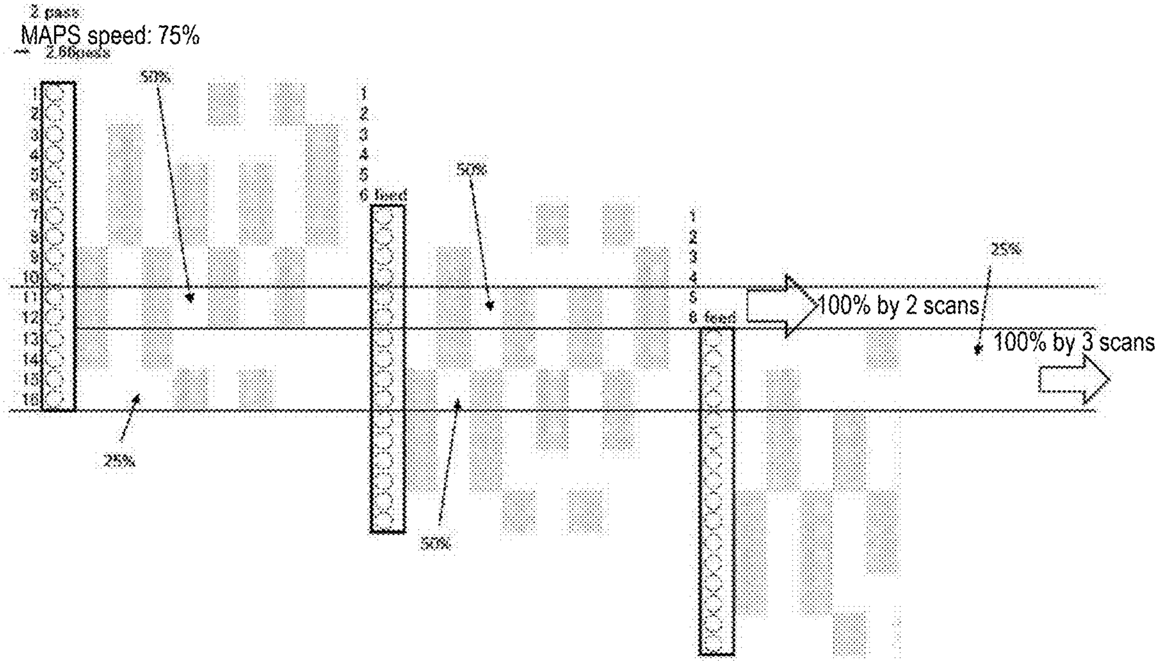
Figure 4A:
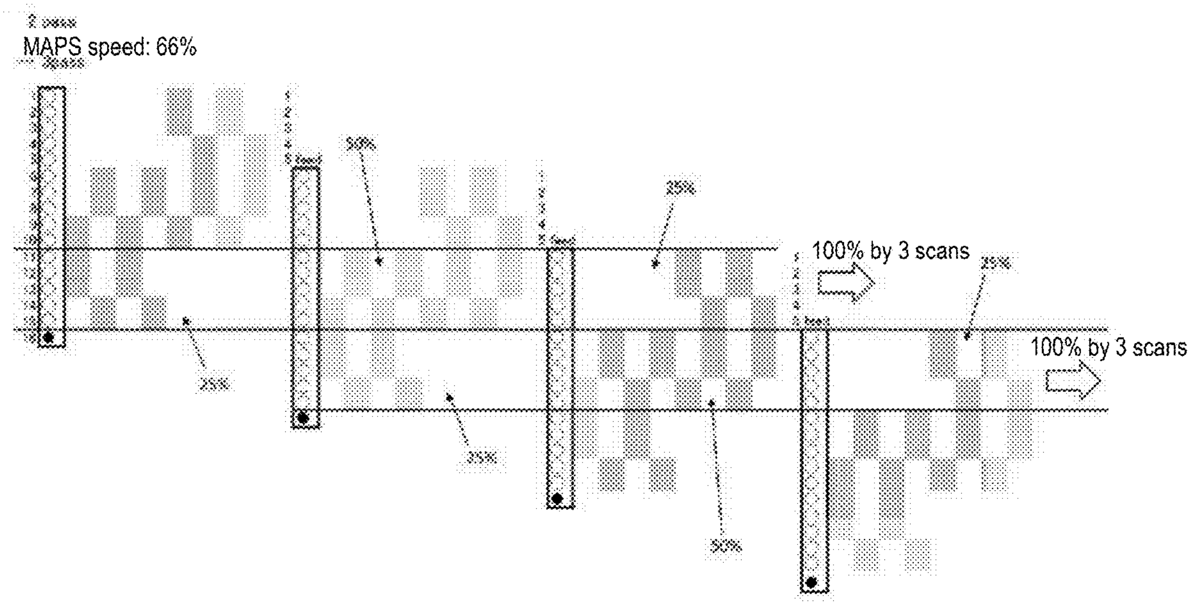
FIGS. 4(*a*)~4(*b*) are drawings illustrating an example of a printing operation in a case where the set number of passes is 2.
Figure 4B:
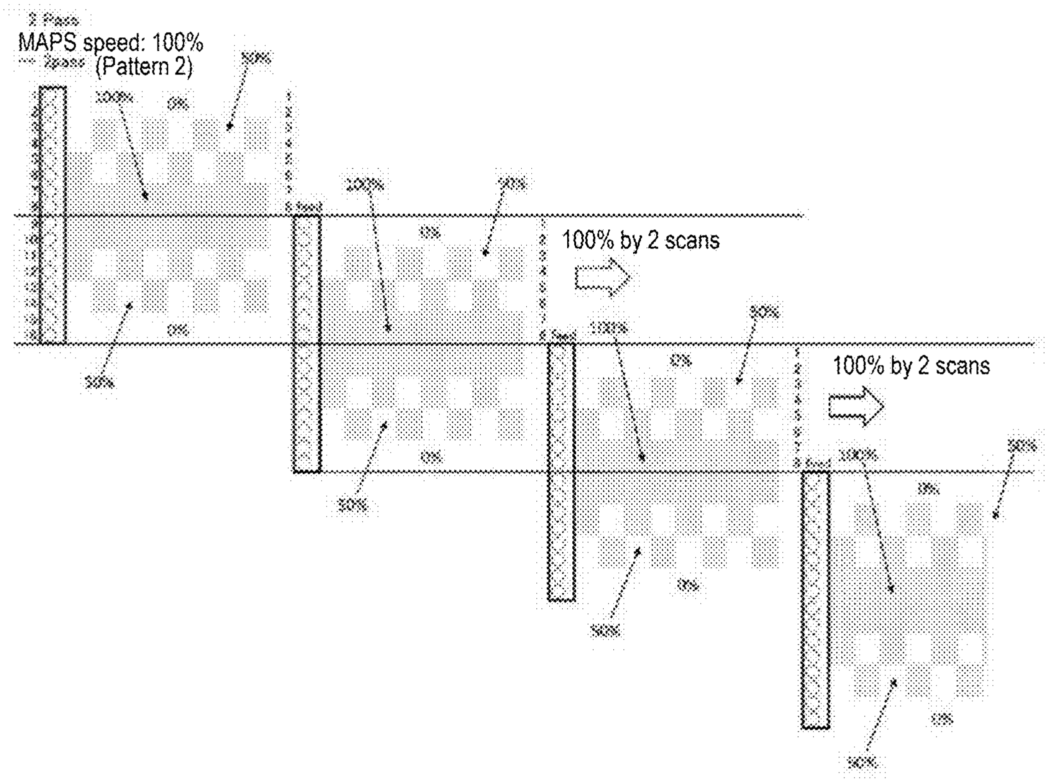

In addition, FIGS. 3 and 4 illustrate an example of the printing operation in a case where the set number of passes is 2 (2 Passes). FIG. 3(*a*) illustrates an example of the printing operation in a case where the set number of passes is 2 and the MAPS speed is 100%. In this case, the manner of selecting the ejection position to eject ink in each main scan is selection of 50% for all the nozzles. In addition, in a case where the set number of passes is 2 in the illustrated configuration, the pass width is the width in the sub scanning direction of 8 nozzles. Therefore, in a case where the set number of passes is 2 and the MAPS speed is 100%, the sub scan movement amount is equal to the width in the sub scanning direction of 8 nozzles corresponding to 100% of the pass width. In addition, as a result, the printing device 10 performs two main scans with respect to all the positions of the medium. The printing device 10 performs ejection of 100% is performed by two main scans (2 scans). In addition, in this case, the decimal number of passes is 2 (2 Passes).

FIG. 3(*b*) illustrates an example of the printing operation in a case where the set number of passes is 2 and the MAPS speed is 75%. In this case, with regard to 4 nozzles on one end side and 4 nozzles on the other end side in the sub scanning direction among the 16 nozzles arranged in the inkjet head 102, the manner of selecting the ejection position to eject ink in each main scan is selection of 25% in which ¼ of the ejection positions of the case of 100% are selected. In addition, with regard to the other 8 nozzles in the central portion, the manner of selecting the ejection position is selection of 50%. Moreover, in a case where the set number of passes is 2 and the MAPS speed is 75%, the sub scan movement amount is equal to the width in the sub scanning direction of 6 nozzles corresponding to 75% of the pass width. In this case, as illustrated in the drawing, the printing device 10 performs ejection of 100% onto one portion of the medium 50 by two main scans (2 scans). In addition, the printing device 10 performs ejection of 100% is performed onto the other portion of the medium 50 by three main scans (3 scans). In addition, in this case, the decimal number of passes is 2.66 (2.66 Passes).

FIG. 4(*a*) illustrates an example of the printing operation in a case where the set number of passes is 2 and the MAPS speed is 66%. In this case, regarding the manner of selecting the ejection position to eject ink in each main scan, one nozzle at the endmost (a nozzle denoted by numeral 16 in the drawing) of the 16 nozzles arranged in the inkjet head 102 is not used in order to adjust a decimal generated by the set value of the MAPS speed. Moreover, with regard to 5 nozzles on one end side and 5 nozzles on the other end side in the sub scanning direction among the remaining 15 nozzles, the manner of selecting the ejection position is selection of 25%. In addition, with regard to the other 5 nozzles in the central portion, the manner of selecting the ejection position is selection of 50%. In addition, in a case where the set number of passes is 2 and the MAPS speed is 66%, the sub scan movement amount is equal to the width in the sub scanning direction of 5 nozzles corresponding to 66% of the pass width. In this case, the width in the sub scanning direction of 5 nozzles corresponding to 66% of the pass width can be considered that the width that changes according to the number (integer value) of nozzles under conditions under which the sub scan can be appropriately performed is closest to 66% of the pass width. In addition, in this case, as illustrated in the drawing, the printing device 10 performs ejection of 100% onto all the positions of the medium 50 by three main scans (3 scans). In addition, the decimal number of passes is 3 (3 Passes).

In addition, as also described above, it is also conceivable to cause the user to select the mask used to determine the ejection position to eject ink in the main scan from among a plurality of types of masks. In this case, the manner of ejecting ink changes even with the same set number of passes and the same MAPS speed. For example, in a case where the set number of passes is 2 and the MAPS speed is 100%, the printing operation may be performed as illustrated in FIG. 4(*b*). FIG. 4(*b*) illustrates a modified example of the printing operation in a case where the set number of passes is 2 and the MAPS speed is 100%. In this case, for 2 nozzles on one end side and 2 nozzles on the other end side in the sub scanning direction among the 16 nozzles arranged in the inkjet head 102, the manner of selecting the ejection position to eject ink in each main scan is selection of 0% in which no ink is ejected. In addition, for the third to sixth nozzles from the ends on one end side and the other end side, the manner of selecting the ejection position is selection of 50%. Furthermore, for the other 4 nozzles in the central portion, the manner of selecting the ejection position is selection of 100%. Also in this case, since the set number of passes is 2 and the MAPS speed is 100%, the sub scan movement amount is equal to the width in the sub scanning direction of 8 nozzles corresponding to 100% of the pass width. Also in this case, as illustrated in the drawing, the printing device 10 performs ejection of 100% onto all the positions of the medium 50 by two main scans (2 scans). In addition, the decimal number of passes is 2 (2 Passes).

Figure 5:
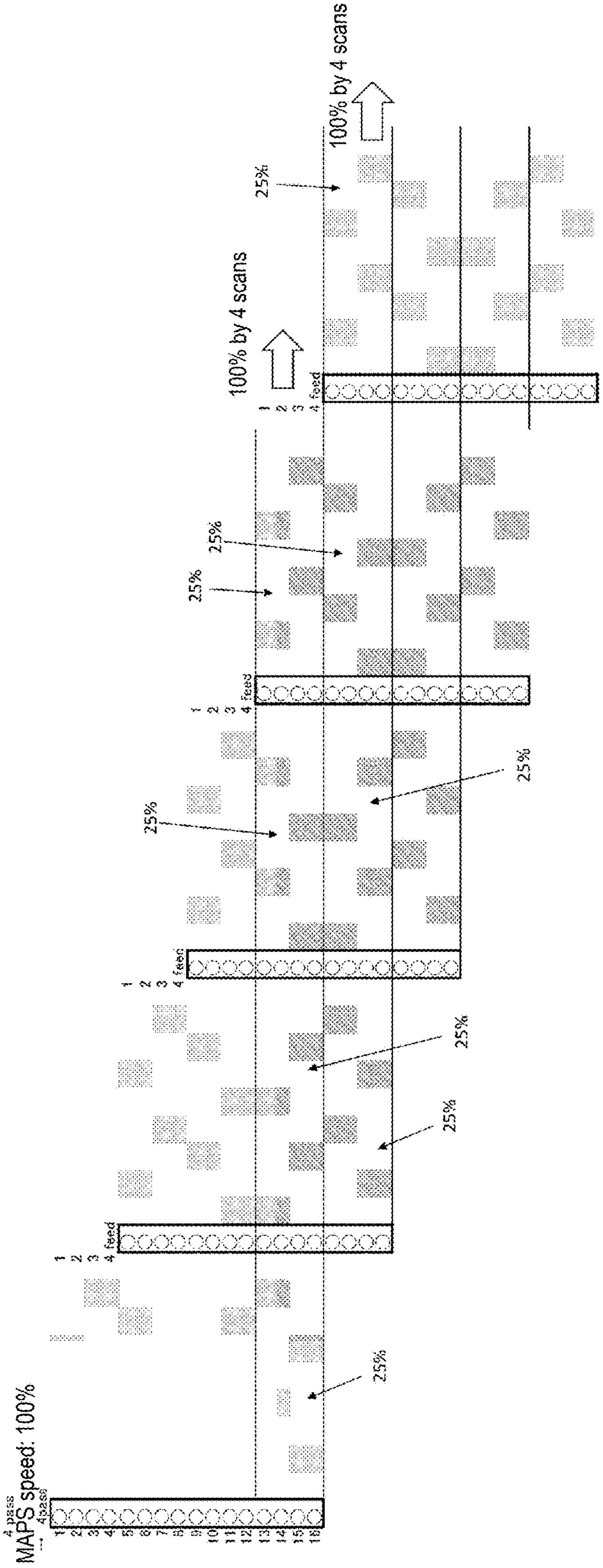
FIG. 5 is a drawing illustrating an example of a printing operation in a case where the set number of passes is 4 and the MAPS speed is 100%.

In addition, the printing operation using the MAPS function can also be performed in a manner identical or similar to the above description in a case where the set number of passes is larger. For example, in a case where the set number of passes is 4, the printing operation as illustrated in FIG. 5 can be performed. FIG. 5 illustrates an example of the printing operation in a case where the set number of passes is 4 (4 Passes) and the MAPS speed is 100%. In this case, with regard to all of the 16 nozzles arranged in the inkjet head 102, the manner of selecting the ejection position to eject ink in each main scan is selection of 25%. In addition, in a case where the set number of passes is 4, the pass width is the width in the sub scanning direction of 4 nozzles. Therefore, in a case where the set number of passes is 4 and the MAPS speed is 100%, the sub scan movement amount is equal to the width in the sub scanning direction of 4 nozzles corresponding to 100% of the pass width. In this case, the printing device 10 performs ejection of 100% onto all the positions of the medium 50 by four main scans (4 scans). In addition, the decimal number of passes is 4 (4 Passes).

Figure 6:
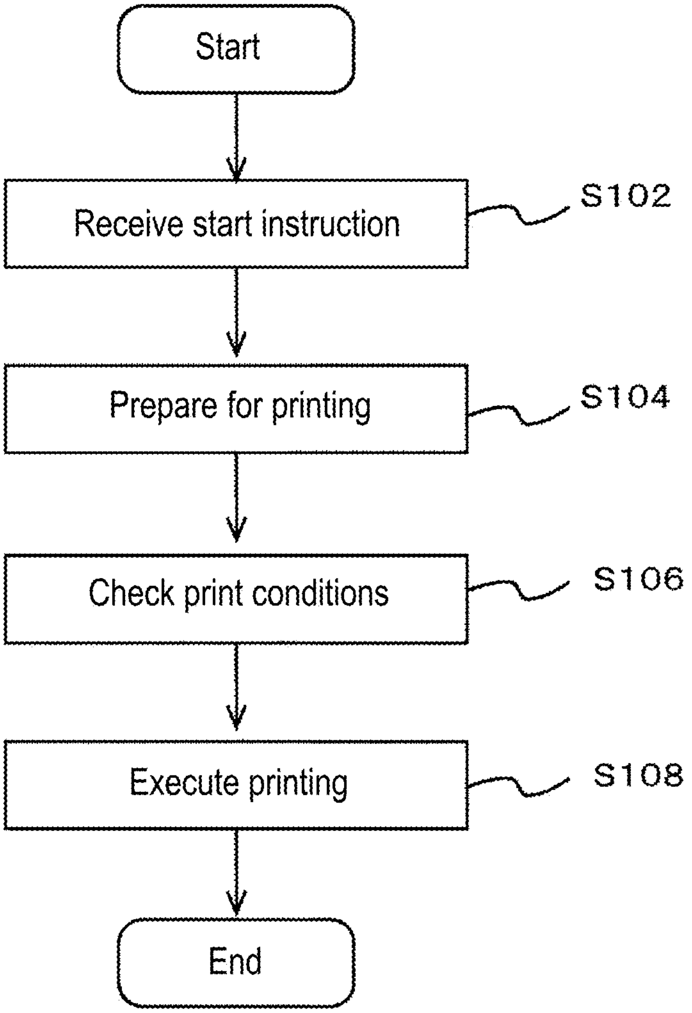
FIG. 6 is a flowchart illustrating an example of a printing operation performed using the printing device 10.

Next, the printing operation performed using the printing device 10 in the present example will be described in more detail with reference to a flowchart. FIG. 6 is a flowchart illustrating an example of the printing operation performed using the printing device 10. In the present example, the printing device 10 starts the printing operation by, for example, receiving a print start instruction from the computer that controls the operation of the printing device 10 (S102). In addition, after starting the printing operation, the printing device 10 performs a preset print preparation operation (S104). The operation of step S104 in the present example is an example of an operation in a data acquisition stage and a condition setting stage. In addition, the process executed in the operation of step S104 can be considered as an example of a data acquisition process and a condition setting process. In step S104, the printing device 10 acquires the print data indicating an image to be printed, and sets the print conditions, which are conditions of printing to be executed by the printing device 10, on the basis of the print data. In this case, the print data can be considered as job data of printing. As the print data, for example, it is conceivable to acquire data generated by performing RIP processing according to the resolution of printing specified by the user in advance. In addition, as will be described in more detail later, the printing device 10 of the present example adjusts the print conditions as necessary. Therefore, the print conditions set in step S104 can be considered as initial values of the print conditions.

In addition, in step S104, the printing device 10 sets the resolution of printing, the set number of passes, the MAPS speed, a main scanning speed (scan speed), and the like as the print conditions. In this case, the main scanning speed can be considered as a speed at which the inkjet head is relatively moved with respect to the medium in the main scan. In addition, as the setting of the main scanning speed, for example, it is conceivable to perform setting for selecting one of a plurality of types of speeds set in advance. In this case, for example, it is conceivable to perform setting for selecting one of a standard speed, which is a standard main scanning speed, and a high speed at which the inkjet head is moved faster than the standard speed. In addition, as also described above, the sub scan movement amount is determined according to the set number of passes and the MAPS speed in the present example. Therefore, the operation in step S104 can also be considered as setting the sub scan movement amount according to the MAPS speed and the like. In addition, in step S104, the printing device 10 sets at least some of the print conditions on the basis of information included in the print data. The printing device 10 may set at least some of the print conditions on the basis of information received from the outside of the printing device 10 together with the print data. The printing device 10 may set at least some of the print conditions on the basis of a manual operation by the user on the printing device 10.

In addition, following the operation in step S104, the printing device 10 checks the print conditions set in step S104, and adjusts the print conditions as necessary (S106). The operation of step S106 in the present example is an example of an operation in a condition check stage. In addition, the process executed in the operation of step S106 can be considered as an example of a condition check process. In addition, after checking the print conditions in step S106, the printing device 10 executes the printing operation on the basis of the print data and the print conditions (S108). The operation of step S108 in the present example is an example of an operation in a print execution stage. In addition, the process executed in the operation of step S108 can be considered as an example of a print execution process. According to the present example, the printing operation based on the print data can be appropriately executed. In addition, in this case, the print conditions can be appropriately adjusted as necessary by the operation in step S106.

Next, the operation performed in step S106 will be described in more detail. In the present example, at least a part of the operation performed in step S106 may be an operation performed in a case where a predetermined operation mode is set. In this case, for example, it is conceivable to adjust the print conditions and the like in a case where an operation mode for enabling the nozzle recovery is set. In addition, in the present example, in the case of adjusting the print conditions and the like, it is checked in step S106 whether or not the nozzle recovery for a defective nozzle is possible under the print conditions set in step S104. In a case where there is a defective nozzle for which the nozzle recovery is impossible as the result of checking, the print conditions are adjusted by lowering the MAPS speed, to search for a print condition that enables the nozzle recovery. Furthermore, the user is caused to select whether or not to change the print condition or the like on the basis of the result of checking or search described above. In addition, more specifically, in step S106, it is conceivable to check and adjust the print conditions, for example, as illustrated in FIGS. 7 and 8.

Figure 7:
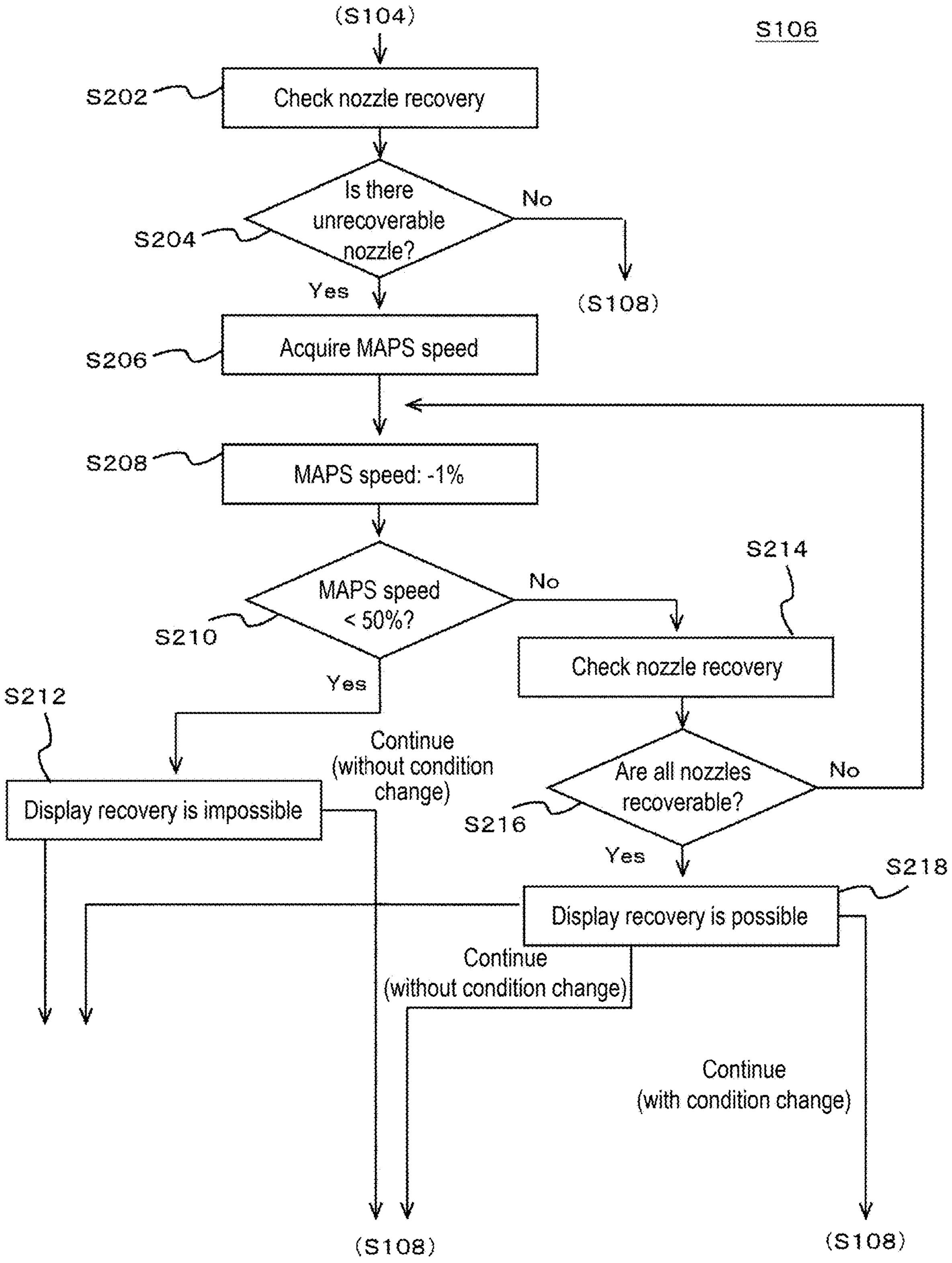
FIG. 7 is a flowchart illustrating an example of a detailed operation performed in step S106.
Figure 8A:
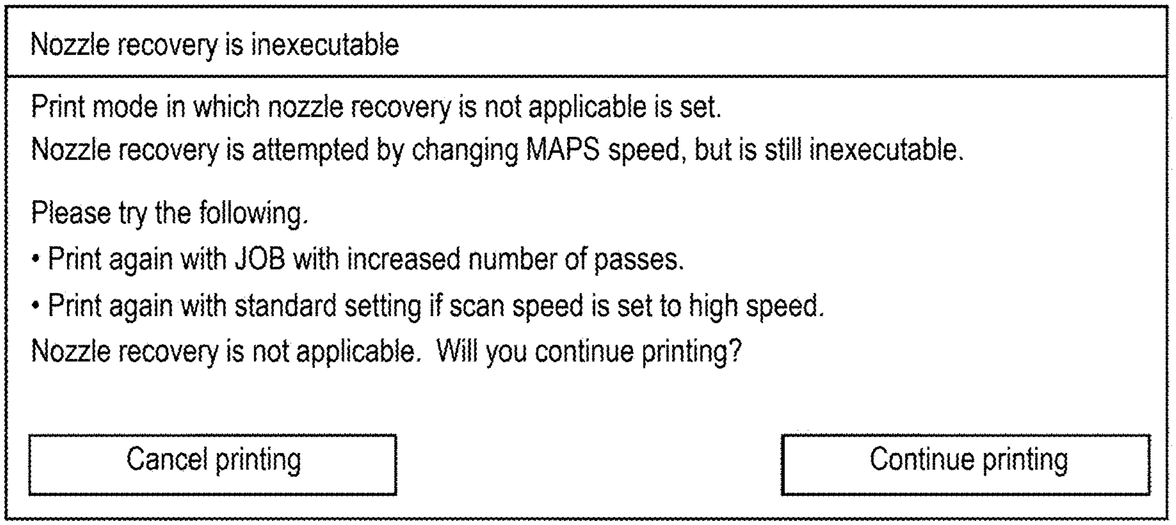
FIGS. 8(*a*)~8(*b*) are drawings illustrating an example of information displayed to a user in the operation of step S106.
Figure 8B:
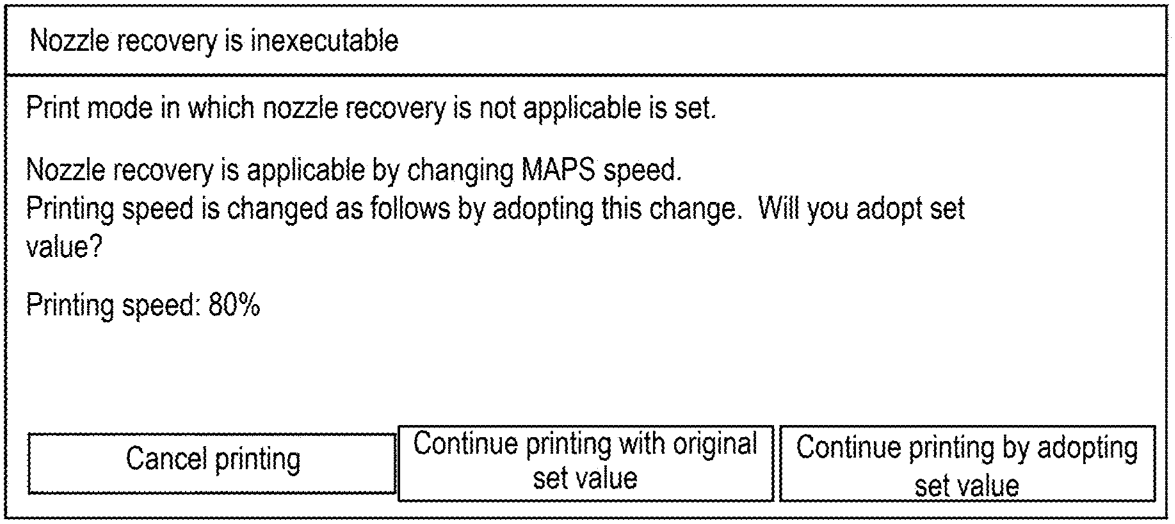

FIG. 7 is a flowchart illustrating an example of the detailed operation performed in step S106. FIG. 8 illustrates an example of information displayed to the user in the operation of step S106. FIGS. 8(*a*) and 8(*b*) illustrate an example of a dialog requesting the user to perform selection while indicating information. The operation described below can be considered as an example of an operation executed in a state where the setting for executing the nozzle recovery is made in the printing device 10 (a state where the nozzle recovery is enabled). In addition, in the operation of step S106 in the present example, the printing device 10 checks the presence or absence of a defective nozzle and checks whether or not the nozzle recovery for the defective nozzle is possible by the process performed by the control unit 22 as the defective nozzle check processing part 204 and the recovery check processing part 206 (S202). In this case, checking the presence or absence of the defective nozzle can be considered as checking whether or not the defective nozzle is present in the nozzle row of any inkjet head 102 in the head unit 12. In addition, the operation of step S202 in the present example is an example of an operation in a defective nozzle check stage and a recovery check stage. Moreover, the process executed in the operation of step S202 can be considered as an example of a defective nozzle check process and a recovery check process. In addition, in step S202, the printing device 10 checks whether or not the nozzle recovery for the defective nozzle registered in advance is possible on the basis of the print conditions set in step S104 of the operation described using FIG. 6.

In addition, after checking the presence or absence of the defective nozzle and whether or not the nozzle recovery is possible in step S202, the printing device 10 makes the subsequent process different depending on whether or not there is a defective nozzle for which the nozzle recovery is impossible by, for example, the process performed by the control unit 22 as the recovery check processing part 206 (S204). In a case where there is no defective nozzle, or where the nozzle recovery is possible for every defective nozzle even if there is a defective nozzle (S204, No), the process proceeds to step S108 without adjusting the print conditions, and the printing operation is executed. In this case, the printing device 10 executes the printing operation on the basis of the print conditions set in step S104 of FIG. 6 while performing the nozzle recovery as necessary. On the other hand, in a case where there is a defective nozzle and the nozzle recovery is impossible for at least one defective nozzle (S204, Yes), the process proceeds to the operation of step S206 and subsequent steps, and a new print condition that enables the nozzle recovery is searched for. In the present example, the operation performed in step S206 and subsequent steps is an example of an operation in a condition search stage. In addition, the process executed in the operation of step S206 and subsequent steps can be considered as an example of a condition search process. The condition search stage can be considered as a stage of searching for the new print condition in a case where there is a defective nozzle and the nozzle recovery is impossible.

In addition, in the operation of step S206 and subsequent steps, the printing device 10 adjusts the print conditions by changing the MAPS speed by the process performed by the control unit 22 as the condition search processing part 208, to search for the print condition that enables the nozzle recovery. In this case, the printing device 10 acquires the MAPS speed from the print conditions set in step S104 (S206), and changes the value of the acquired MAPS speed with a predetermined pitch width (S208). In addition, the printing device 10 of the present example changes the MAPS speed in a direction in which the value decreases with a pitch width of 1%, to search for the print condition that enables the nozzle recovery. In this case, the pitch width of 1% can be considered as a pitch width corresponding to 1/100 of the MAPS speed of 100%. The pitch width for changing the MAPS speed in step S208 may be other than 1%. In this case, it is preferable to change the MAPS speed with a pitch width of, for example, 2% or less (for example, about 0.5 to 2%). With such a configuration, the print conditions can be appropriately adjusted without greatly changing the print condition.

In addition, as also described above, in the present example, a value in a range from 50% or more to 100% or less is used as the MAPS speed. Therefore, after changing the MAPS speed in step S208, it is determined whether the changed MAPS speed is appropriate (S210). More specifically, the printing device 10 of the present example determines whether or not the changed MAPS speed is less than 50%. In a case where the changed MAPS speed is less than 50% (S210, Yes), the user is notified that the new print condition enabling the nozzle recovery has not been found and the nozzle recovery becomes impossible, and selection by the user regarding the subsequent operation is received (S212). In this case, the printing device 10 displays a dialog on a monitor of the computer that controls the operation of the printing device 10, thereby notifying the user and receiving an instruction from the user via the computer. In addition, in step S212, the printing device 10 notifies the user that the new print condition enabling the nozzle recovery has not been found by displaying, for example, the dialog illustrated in FIG. 8(*a*) to the user. In addition, regarding the subsequent operation, the user is caused to select either print cancellation to stop the printing operation or print continuation to continue printing. In a case where the print cancellation is selected, the printing device 10 stops the printing operation without proceeding to step S108. In addition, in a case where the print continuation is selected, the process proceeds to step S108 by directly using the print conditions set in step S104 without changing the print condition, and the printing operation is executed.

In addition, in the present example, even in a case where the new print condition that enables the nozzle recovery is not found only by changing the MAPS speed, the nozzle recovery may become possible by changing the set number of passes or the main scanning speed. More specifically, in a case where the set number of passes is changed, the sub scan movement amount in a case where the MAPS speed is 100% changes, so that the condition under which the nozzle recovery becomes possible changes. In addition, in a case where the main scanning speed changes, the density of the ejection position at which ink can be ejected from one nozzle in one main scan changes, so that the nozzle recovery may become possible. For example, in a case where the main scanning speed under the original print conditions is the high speed, the nozzle recovery may become possible by changing the main scanning speed to the standard speed. Therefore, in the present example, the user is prompted to change the set number of passes by, for example, proposing creation of a job in which the number of passes is increased corresponding to the print data in which the set number of passes is increased, under a predetermined condition under which the dialog illustrated in FIG. 8(*a*) is to be displayed. In addition, the change of the main scanning speed is prompted by proposing a change from the high speed setting to the standard setting for the main scanning speed (scan speed) under the same predetermined condition. In addition, in this case, the fact that the new print condition that enables the nozzle recovery is not found can be considered as an example of the predetermined condition. Moreover, the user may be prompted to change the set number of passes or the main scanning speed under another predetermined condition. For example, in a case where the new print condition that enables the nozzle recovery is found, but a decrease in the printing speed caused by the new print condition is larger than a predetermined reference, the user may be prompted to change the set number of passes or the main scanning speed.

In addition, in step S210, in a case where the changed MAPS speed is not less than 50% (S210, No), the printing device 10 checks whether or not the nozzle recovery for the defective nozzle is possible under the print condition using the changed MAPS speed identically or similarly to the operation in step S202 (S214). In addition, following the operation in step S214, the printing device 10 checks whether or not the nozzle recovery is possible for every defective nozzle identically or similarly to the operation in step S204 (S216). In this case, in steps S214 and S216, it is conceivable to perform the above process by further performing the process as the defective nozzle check processing part 204 and the recovery check processing part 206 in the process performed by the control unit 22 as the condition search processing part 208. In addition, in a case where it is determined in step S216 that the nozzle recovery is impossible for at least one defective nozzle (S216, No), the process proceeds to step S208 again, and the subsequent operations are repeated. In addition, as a result, for example, the MAPS speed is further changed to search for the new print condition.

In addition, in a case where it is determined in step S216 that the nozzle recovery is possible for every defective nozzle by using the changed MAPS speed (S216, Yes), the user is notified that the new print condition enabling the nozzle recovery has been found and the nozzle recovery becomes possible, and selection by the user regarding the subsequent operation is received (S218). Also in this case, the printing device 10 displays a dialog on the monitor of the computer that controls the operation of the printing device 10, thereby notifying the user and receiving an instruction from the user via the computer. In addition, in step S218, the printing device 10 notifies the user that the new print condition enabling the nozzle recovery has been found by displaying, for example, the dialog illustrated in FIG. 8(*b*) to the user. In addition, while displaying the printing speed corresponding to the MAPS speed under the new print condition, the printing device 10 causes the user to select any one of print cancellation for stopping the printing operation, continuation of printing with the original set value, and continuation of printing with the new set value for the subsequent operation. In this case, the continuation of printing with the original set value can be considered as performing printing using the MAPS speed under the print conditions set in step S104. The continuation of printing by adopting the new set value can be considered as performing printing using the MAPS speed changed in step S106.

In a case where the print cancellation is selected, the printing device 10 stops the printing operation without proceeding to step S108. In addition, in a case where the continuation of printing with the original set value is selected, the process proceeds to step S108 by directly using the print conditions set in step S104 without changing the print condition, and the printing operation is executed. In addition, as a result, the printing operation is executed without performing the nozzle recovery for at least one defective nozzle. In addition, in a case where the continuation of printing by adopting the new set value is selected, the process proceeds to step S108 by adopting the changed MAPS speed and performing the nozzle recovery on all the defective nozzles, and the printing operation is executed. By displaying such a dialog, the user is allowed to select, in a case where the new print condition that enables the nozzle recovery is found, either to execute printing using the new print condition or to execute printing by performing no nozzle recovery without using the new print condition. Therefore, according to the present example, the printing device 10 is allowed to more appropriately execute the printing operation based on the print data on the basis of the user's selection received in the operation of searching for the new print condition.

Considering performing the nozzle recovery to execute printing with high quality, it is conceivable that the new print condition may be automatically adopted without causing the user to select whether or not to adopt the new print condition. In addition, depending on the purpose of printing or the like, it may be preferable to automatically adopt the new print condition. However, in a case where the MAPS speed is changed to lower speed, the printing speed decreases according to the amount of change in the MAPS speed. In addition, as a result, it takes longer to complete the printing, and the printing cannot be completed before a timing desired by the user in some cases. In addition, in a case where the amount of change in the MAPS speed is large, the printing cannot be performed with the quality desired by the user in some cases due to a change in the quality of printing even in a direction in which the quality of printing is improved. On the other hand, according to the present example, the user is allowed to appropriately select whether or not to adopt the new print condition by displaying the dialogue as described above. This makes it possible to more appropriately execute the printing operation under the print condition that matches the user's desire.

Next, additional description will be made on the configuration described above. In the above example, the nozzle to be used can be changed in each pass by changing the MAPS speed in the MAPS function. In addition, this makes it possible to appropriately change the nozzle that can be used as the alternative nozzle for the defective nozzle. Therefore, according to the present example, even in a case where the nozzle recovery cannot be performed under the initial print conditions, the new print condition that enables the nozzle recovery can be appropriately searched for. Furthermore, in this case, by changing the MAPS speed, a condition that does not change the set number of passes and the resolution of printing can be used as the new print condition that enables the nozzle recovery. Therefore, according to the present example, it is possible to appropriately reduce the influence of the defective nozzle while appropriately preventing a large change in the quality of printing and a significant decrease in the printing speed. In addition, in this case, the nozzle recovery can be appropriately performed without re-creating the print data (job), replacing the inkjet head, and the like. Moreover, this makes it possible to appropriately prevent rework, production suspension, and the like, and to efficiently produce a printed matter.

In addition, in the present example, the search for the print condition that enables the nozzle recovery can also be considered focusing on the sub scan movement amount. In this case, the operation of searching for the new print condition can be considered as searching for the print condition that enables the nozzle recovery by changing the sub scan movement amount. In addition, in this case, the operation of searching for the new print condition can be considered as changing the MAPS speed to change the sub scan movement amount corresponding to the MAPS speed, and searching for the print condition that enables the nozzle recovery. Moreover, in this case, as also described above, the MAPS speed is changed in the range of 100% or less and 50% or more. In this case, the sub scan movement amount changes in a range from 0.5 times or more to 1 time or less of the pass width. With such a configuration, the new print condition that enables the nozzle recovery can be appropriately searched for.

In addition, as described above, in the operation of searching for the new print condition in the present example, the MAPS speed is changed in the direction of decreasing the MAPS speed. In this case, it can be considered that the MAPS speed is changed in the direction in which the quality of printing is improved. With such a configuration, it is possible to appropriately search for the new print condition while maintaining the quality of printing desired by the user. In addition, depending on the quality of printing, printing time, or the like desired by the user, the new print condition may be searched for by changing the MAPS speed in a direction of increasing the MAPS speed, which is a direction in which the quality of printing may deteriorate. For example, it is conceivable to increase the MAPS speed and search for the new print condition that enables the nozzle recovery in a case where the nozzle recovery does not become possible even if the MAPS speed is changed to less than 50% or the change amount of the MAPS speed becomes too large in the direction of decreasing the MAP speed, for example.

In addition, as also described above, in the present example, in a case where the new print condition is found, the printing device 10 causes the user to select whether or not to adopt the new print condition. On the other hand, in a modified example of the printing operation, it is also conceivable to omit the selection by the user and automatically adopt the new print condition under a predetermined condition. For example, in a case where the new print condition that enables the nozzle recovery is found in the operation of searching for the new print condition, it is conceivable that the printing device 10 further determine whether or not the new print condition matches a registered condition registered in advance. In a case where the conditions match, the printing device 10 may execute the printing operation based on the print data using the new print condition without causing the user to select whether or not to execute printing using the new print condition. With such a configuration, the printing operation under the new print condition can be more efficiently executed. In addition, whether or not to continue such an automatic printing operation may be switched according to an operation mode set for the printing device 10. In this case, in the case of a predetermined operation mode, the new print condition is automatically adopted as described above. In addition, depending on the configuration of the printing device 10 or the like, the new print condition may be automatically adopted by omitting the selection by the user at all times, for example, in a predetermined operation mode.

In addition, depending on the quality required for printing, the purpose of printing, or the like, it is sometimes necessary to determine the change in the quality of printing and the decrease in the printing speed caused by changing the print condition with a stricter standard. In addition, as a result, even in a case where the new print condition that enables the nozzle recovery is found, it is sometimes desirable to stop (cancel) the printing operation without adopting the new print condition. In this regard, in the present example, the printing operation can be stopped by the user selecting the print cancellation in response to the display of the dialog illustrated in FIG. 8(*b*), for example. In addition, in a modified example of the printing operation, the printing operation may be automatically stopped on the basis of a predetermined condition, for example. In this case, in the operation of searching for the new print condition, the printing device 10 determines whether or not the new print condition matches a print stop condition registered as a condition for stopping printing. In a case where the conditions match, the printing operation is automatically stopped without confirming the intention of the user. With such a configuration, the printing operation can be appropriately stopped under a predetermined condition. As the print stop condition, for example, it is conceivable to register a condition corresponding to a change in the quality of printing beyond a predetermined allowable range, an increase in the printing time beyond a predetermined rate, or the like according to the quality of printing, the printing speed, or the like desired by the user.

In addition, as also described above, in the present example, in a case where the new print condition that enables the nozzle recovery is not found, the printing device 10 prompts the user to change the set number of passes or the main scanning speed by displaying the dialog illustrated in FIG. 8(*a*), for example. On the other hand, depending on the purpose of printing or the like, a condition other than the MAPS speed may be further changed automatically during the operation of searching for the new print condition. In addition, in this case, it is conceivable to further change both or one of the set number of passes and the main scanning speed to search for the new print condition that enables the nozzle recovery. With such a configuration, the print condition that enables the nozzle recovery can be searched for from among more conditions. In addition, this makes it possible to appropriately search for a more preferable new print condition according to the purpose of printing or the like. In this case, it is conceivable to search for a condition under which printing can be continued with a smallest decrease in the printing speed as the new print condition. With such a configuration, a more appropriate new print condition can be presented to the user.

INDUSTRIAL APPLICABILITY

The present invention can be suitably used, for example, for a printing method.

What is claimed is:

1. A printing method for performing printing using a printing device, the printing method comprising:

a data acquisition stage of acquiring print data indicating an image to be printed;

a condition setting stage of setting a print condition that is a condition of printing to be executed by the printing device;

a condition check stage of checking the print condition set in the condition setting stage; and a print execution stage of causing the printing device to execute a printing operation based on the print data, wherein the printing device includes an inkjet head having a nozzle row in which a plurality of nozzles are arranged, performs printing on a medium as a printing target by causing the inkjet head to perform a main scan of ejecting ink while relatively moving in a predetermined main scanning direction with respect to the medium, and a sub scan of relatively moving in a sub scanning direction orthogonal to the main scanning direction with respect to the medium, and is able to execute a pass modulation operation in which the main scan is executed on a basis of a set number of passes that is a number set with an integer value of 1 or more and a number of times of the main scan performed on at least a part of the medium is made larger than the set number of passes, in the condition setting stage, at least a pass modulation degree indicating a degree of modulation for changing the number of times of the main scan performed on at least a part of the medium in the pass modulation operation is set as the print condition, and the condition check stage includes a defective nozzle check stage of checking whether or not a defective nozzle that is the nozzle having a defective ejection characteristic is present in the nozzle row of the inkjet head, a recovery check stage of checking whether or not nozzle recovery is possible using the nozzle different from the defective nozzle in a case where the defective nozzle is present, and a condition search stage of searching for a new print condition that is the new print condition in a case where the defective nozzle is present and the nozzle recovery is impossible, the condition search stage being a stage of searching for the print condition that enables the nozzle recovery by changing the pass modulation degree.

2. The printing method as set forth in claim 1, wherein in the pass modulation operation, an average value of the number of times of the main scan in which the inkjet head passes through a position facing each position of the medium is changed in a range from the set number of passes or more to twice the set number of passes or less on a basis of the pass modulation degree.

3. The printing method as set forth in claim 1, wherein the pass modulation degree is a parameter that takes a value corresponding to 100% in a case where the main scan of the set number of passes is performed on the entire medium, and takes a value corresponding to 50% in a case where the main scans of twice the set number of passes are performed on the entire medium, and in the condition search stage, the print condition that enables the nozzle recovery is searched for by changing the pass modulation degree with a pitch width of 2% or less with the value corresponding to 100%.

4. The printing method as set forth in claim 3, wherein in the condition search stage, the pass modulation degree is changed in a range of less than or equal to the value corresponding to 100% and more than or equal to the value corresponding to 50%.

5. The printing method as set forth in claim 1, wherein in the condition setting stage, a sub scan movement amount that is a movement amount of relatively moving the inkjet head with respect to the medium in the single sub scan is set according to the pass modulation degree, and in the condition search stage, the print condition that enables the nozzle recovery is searched for by changing the pass modulation degree to change the sub scan movement amount corresponding to the pass modulation degree.

6. The printing method as set forth in claim 1, wherein in a case where the new print condition that enables the nozzle recovery is found in the condition search stage, a user is caused to select either to execute printing using the new print condition or to execute printing by performing no nozzle recovery without using the new print condition, and in the print execution stage, the printing device is caused to execute the printing operation based on the print data on a basis of the user's selection received in the condition search stage.

7. The printing method as set forth in claim 6, wherein in a case where the new print condition that enables the nozzle recovery is found in the condition search stage, it is further determined whether or not the new print condition matches a registered condition registered in advance, and in a case where the new print condition matches the registered condition, without causing the user to select whether or not to execute printing using the new print condition, the printing device is caused to execute the printing operation based on the print data using the new print condition in the print execution stage.

8. The printing method as set forth in claim 1, wherein in the condition search stage, it is determined whether or not the new print condition matches a print stop condition registered as a condition for stopping printing, and in a case where the new print condition matches the print stop condition, the printing operation is stopped.

9. The printing method as set forth in claim 1, wherein in the condition search stage, the print condition that enables the nozzle recovery is searched for by further changing the set number of passes or a main scanning speed that is a speed at which the inkjet head is relatively moved with respect to the medium in the main scan.

10. The printing method as set forth in claim 1, wherein in the condition search stage, a user is prompted to change a main scanning speed that is a speed at which the inkjet head is relatively moved with respect to the medium in the main scan under a predetermined condition.

11. The printing method as set forth in claim 1, wherein a user is prompted to change the set number of passes under a predetermined condition.

12. A printing device that performs printing, the printing device comprising:

an inkjet head having a nozzle row in which a plurality of nozzles are arranged;

a main scan driving unit configured to cause the inkjet head to perform a main scan of ejecting ink while relatively moving in a predetermined main scanning direction with respect to a medium as a printing target;

a sub scan driving unit configured to cause the inkjet head to perform a sub scan of relatively moving in a sub scanning direction orthogonal to the main scanning direction with respect to the medium; and a control unit configured to control operations of the inkjet head, the main scan driving unit, and the sub scan driving unit, the printing device performing printing on the medium by causing the inkjet head to perform the main scan and the sub scan, and being able to execute a pass modulation operation in which the main scan is executed on a basis of a set number of passes that is a number set with an integer value of 1 or more and a number of times of the main scan performed on at least a part of the medium is made larger than the set number of passes, wherein the control unit executes a data acquisition process of acquiring print data indicating an image to be printed, a condition setting process of setting a print condition that is a condition of printing to be executed by the printing device, a condition check process of checking the print condition set in the condition setting process, and a print execution process of causing the printing device to execute a printing operation based on the print data, in the condition setting process, at least a pass modulation degree indicating a degree of modulation for changing the number of times of the main scan performed on at least a part of the medium in the pass modulation operation is set as the print condition, and in the condition check process, the control unit executes a defective nozzle check process of checking whether or not a defective nozzle that is the nozzle having a defective ejection characteristic is present in the nozzle row of the inkjet head, a recovery check process of checking whether or not nozzle recovery is possible using the nozzle different from the defective nozzle in a case where the defective nozzle is present, and a condition search process of searching for the new print condition in a case where the defective nozzle is present and the nozzle recovery is impossible, the condition search process being a process of searching for the print condition that enables the nozzle recovery by changing the pass modulation degree.

13. A non-transitory computer readable medium storing a program for controlling an operation of a printing device that performs printing, the program causing the printing device to perform:

a data acquisition process of acquiring print data indicating an image to be printed;

a condition setting process of setting a print condition that is a condition of printing to be executed by the printing device;

a condition check process of checking the print condition set in the condition setting process; and a print execution process of causing the printing device to execute a printing operation based on the print data, wherein the printing device includes an inkjet head having a nozzle row in which a plurality of nozzles are arranged, performs printing on a medium as a printing target by causing the inkjet head to perform a main scan of ejecting ink while relatively moving in a predetermined main scanning direction with respect to the medium, and a sub scan of relatively moving in a sub scanning direction orthogonal to the main scanning direction with respect to the medium, and is able to execute a pass modulation operation in which the main scan is executed on a basis of a set number of passes that is a number set with an integer value of 1 or more and a number of times of the main scan performed on at least a part of the medium is made larger than the set number of passes, in the condition setting process, at least a pass modulation degree indicating a degree of modulation for changing the number of times of the main scan performed on at least a part of the medium in the pass modulation operation is set as the print condition, and in the condition check process, the printing device is caused to perform a defective nozzle check process of checking whether or not a defective nozzle that is the nozzle having a defective ejection characteristic is present in the nozzle row of the inkjet head, a recovery check process of checking whether or not nozzle recovery is possible using the nozzle different from the defective nozzle in a case where the defective nozzle is present, and a condition search process of searching for the new print condition in a case where the defective nozzle is present and the nozzle recovery is impossible, the condition search process being a process of searching for the print condition that enables the nozzle recovery by changing the pass modulation degree.

* * * * *